(12) United States Patent
Taylor (10) Patent No.: US 8,872,008 B2
(45) Date of Patent: Oct. 28, 2014

(54) DUAL PLECTRUM SYSTEMS FOR STRINGED INSTRUMENTS

(71) Applicant: Plectone, LLC, Albuquerque, NM (US)

(72) Inventor: Robert A. Taylor, La Jara, NM (US)

( * ) Notice: Subject to any disclaimer, the term of this patent is extended or adjusted under 35 U.S.C. 154(b) by 0 days.

(21) Appl. No.: 13/838,984

(22) Filed: Mar. 15, 2013

(65) Prior Publication Data

US 2014/0033894 A1 Feb. 6, 2014

Related U.S. Application Data

(60) Provisional application No. 61/679,931, filed on Aug. 6, 2012.

(51) Int. Cl.
*G10D 3/16* (2006.01)
*B29C 45/14* (2006.01)
*B32B 37/16* (2006.01)
*B29L 31/00* (2006.01)

(52) U.S. Cl.
CPC .......... *G10D 3/163* (2013.01); *B29C 45/14065* (2013.01); *B29C 45/14467* (2013.01); *B29C 2045/14532* (2013.01); *B32B 37/16* (2013.01); *B29L 2031/758* (2013.01)
USPC .......................................................... 84/322

(58) Field of Classification Search
CPC ....................................................... G10D 3/163
USPC .................................................... 84/320–322
See application file for complete search history.

(56) References Cited

U.S. PATENT DOCUMENTS

| | | | |
|---|---|---|---|
| 3,304,826 A * | 2/1967 | Caron | 84/322 |
| 3,312,137 A * | 4/1967 | Oddo | 84/322 |
| 4,651,614 A | 3/1987 | Cavallo | |
| 5,253,562 A | 10/1993 | Kline | |
| 5,594,189 A | 1/1997 | Latteri | |
| 6,342,661 B1 | 1/2002 | Flamm | |
| D561,237 S | 2/2008 | Morris et al. | |
| D577,379 S | 9/2008 | Morris | |
| D632,728 S | 2/2011 | Goad | |
| 2008/0110319 A1 | 5/2008 | Morris | |
| 2009/0056521 A1 | 3/2009 | Goad | |

FOREIGN PATENT DOCUMENTS

| | | |
|---|---|---|
| AU | 200126403 A1 | 9/2002 |
| GB | 2 348 536 A | 10/2000 |
| GB | 2 400 227 A | 10/2004 |
| JP | 09-297575 | 11/1997 |
| JP | 2006-227548 A | 8/2006 |

* cited by examiner

*Primary Examiner* — Kimberly Lockett
(74) *Attorney, Agent, or Firm* — Isaac Estrada; Deborah A. Peacock; Peacock Myers, P.C.

(57) ABSTRACT

Embodiments of the present invention related to plectrum composite couplers comprising a spacer material, the spacer material comprising an upper surface and a lower surface, and a pivot core that is embedded at least partially in the spacer material. Different embodiment of the invention comprise methods for manufacturing composite couplers, methods of assembling a dual plectrum system comprising a dual plectrum composite coupler, and methods for striking the strings of a stringed instrument using an assembled dual plectrum device comprising said dual plectrum composite coupler.

22 Claims, 8 Drawing Sheets

DUAL PLECTRUM SYSTEMS FOR STRINGED INSTRUMENTS

CROSS-REFERENCE TO RELATED APPLICATIONS

This application claims priority to and the benefit of the filing of U.S. Provisional Patent Application Ser. No. 61/679,931, entitled "DUAL PLECTRUM SYSTEMS FOR STRINGED INSTRUMENTS", filed on Aug. 6, 2012, and the specification thereof is incorporated herein by reference.

BACKGROUND OF THE INVENTION

Field of the Invention (Technical Field)

Embodiments of the present invention relate to double plectrum systems and more particularly to plectrum couplers for double plectrum systems and methods thereof.

Double plectrum systems currently available are comprised of relatively rigid structures that permanently join two plectrum elements together. When for example, a six string guitar is strummed with these double plectrum systems, they create a double note sound effect similar, but not equal, to that produced by a twelve string guitar being strummed with a single plectrum. However, because each plectrum element within current double plectrum systems are formed within relatively rigid structures, the resulting double note sound tends to be of a raspy low quality timbre. There is thus a present need for an invention which addresses this issue by providing an independent plectrum coupler that aids in creating double plectrum systems while allowing each plectrum element to move and pivot independently as if it were being used singly. The ability to employ two plectrums concurrently while preserving the motion dynamics of an individual plectrum greatly improves the quality of sound of the double plectrum system and creates tones that more closely resemble that of a twelve-string guitar being strummed with a single plectrum. There is further a need for such couplers which can be used in conjunction with off-the-shelf plectrums.

BRIEF SUMMARY OF THE INVENTION

Embodiments of the present invention relate to a dual plectrum composite coupler comprising a spacer material, the spacer material comprising an upper surface and a lower surface and a pivot core, which is embedded at least partially in the spacer material, the pivot core comprising a hardness which is greater than a hardness of the spacer material, and the coupler comprises dimensions and a shape which accommodate a pair of plectrums that can be respectively disposed on the upper and the lower surfaces of the coupler and when so disposed thereon, at least a tip of each of the plectrums does not contact the coupler. In one embodiment, the composite spacer material in the coupler has inherent adhesion quality to hold the pair of plectrums in place to a sufficient level for use on a stringed instrument when the composite coupler is sandwiched between two plectrums to form a dual plectrum system.

A different embodiment of the invention comprises a method for manufacturing a composite coupler comprising providing a coupler mold, providing a hardened pivot core, inserting the hardened pivot core into the mold, injecting moldable spacer material softer than the pivot core into the mold and curing a resulting composite structure. In one embodiment, the hardened pivot core is held in place in place so that it is embedded near a center portion of the composite coupler after curing. In one embodiment, an elongated member is placed across the mold in a strategic place to create a cavity in the spacer material when the elongated member is removed therefrom.

Another embodiment of the invention comprises a method for assembling a dual plectrum system comprising said dual plectrum composite coupler of claim 1 comprising aligning and placing an assembled composite coupler device onto a lower independent plectrum, aligning and placing an upper independent plectrum onto the composite coupler device, and compressing the dual plectrum system to cause adhesion forces between the soft spacer material of the composite coupler and the upper and lower plectrums to bind the assembled composite coupler to a sufficient level for use on a stringed instrument.

Also disclose is a method for striking the strings of a stringed instrument using an assembled dual plectrum device comprising said dual plectrum composite coupler above. In one embodiment the method comprises varying gripping pressure of an assembled dual plectrum device to control the level of independent movement of the individual plectrums. In another embodiment, the plectrums are rotated relative to each other to vary the texture and quality of the resulting sound.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

With reference now to the drawings, and in particular FIGS. 1 to 9 thereof, embodiments of new and improved binary plectrum systems enabled by the principles and concepts of embodiments of the present invention will be described.

As illustrated in FIGS. 1 to 3b, one embodiment of the present invention comprises a composite dual plectrum coupler device, having a hardened pivot core 12 and soft pivot spacer 14, which allows a musician to assemble and use a dual plectrum system to strike or strum strings 22 of a stringed instrument such as guitar 20. Optionally, pivot core 12 comprises micro-electronic functionality to allow the musician to use the dynamic motion and/or position of the dual plectrum system to signal additional actions connected to or independent from the stringed instrument. Optionally, pivot core 12 can also comprise one or more LEDs or other types of lights, combinations thereof, and the like. Preferably, pivot core 12 is embedded approximately in the middle of the composite dual plectrum coupler device.

Figure 1:
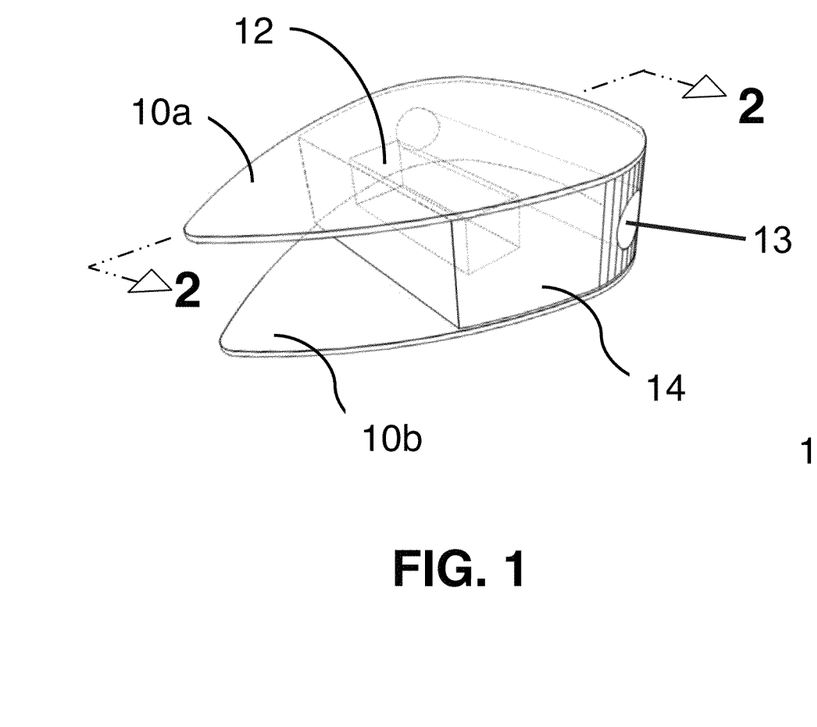
FIG. 1 is an illustration of an embodiment of an assembled dual plectrum system that includes two standard plectrums and a plectrum coupler according to an embodiment of the present invention.
Figure 2:
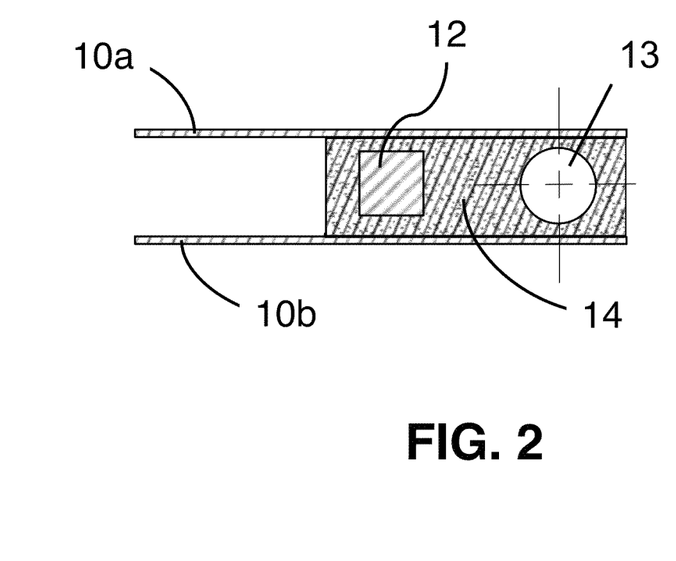
FIG. 2 is a drawing which illustrates a cross-section along axis 2-2 of the embodiment illustrated in FIG. 1.

In one embodiment, an assembled dual plectrum system uses two single standard off-the-shelf plectrums, upper plectrum 10a and lower plectrum 10b, and a composite plectrum coupler formed from pivot spacer 14 and pivot core 12. The composite coupler can preferably be sandwiched between upper and lower plectrums 10a and 10b to form an assembled dual plectrum system. Preferably, pivot spacer 14 comprises perforation 13 across spacer 14 to improve the independent movement of upper and lower plectrums, 10a and 10b, respectively, and which will be described in more detail below. Preferably, pivot core 12 is placed approximately in the middle of the plectrums.

Figure 3A:
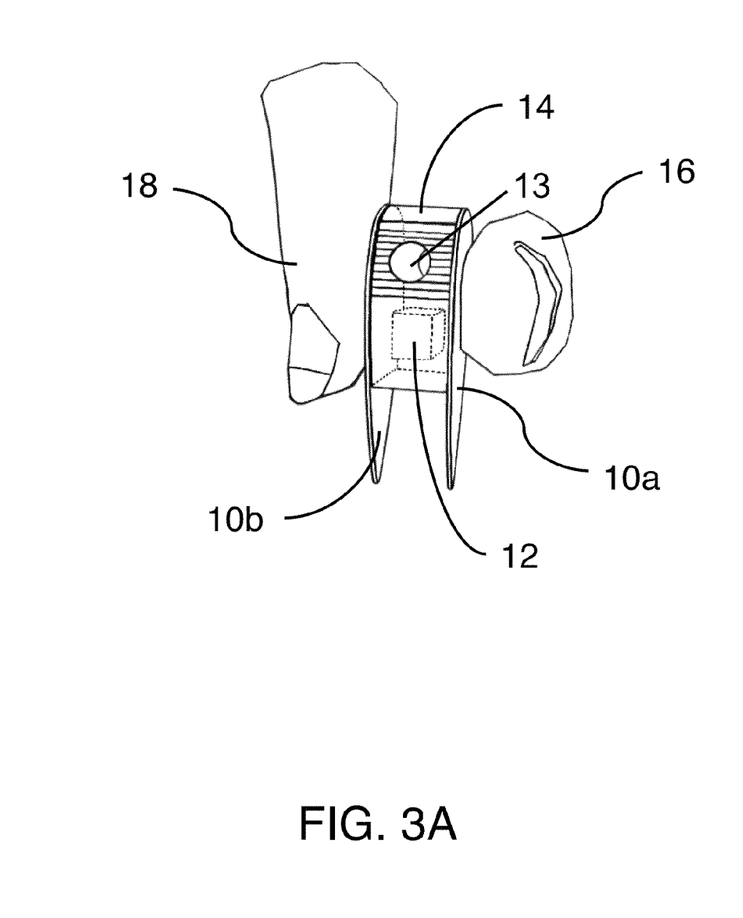
FIGS. 3A and 3B illustrate how the embodiment of an assembled binary plectrum system of FIG. 1 can be gripped/held by the musician and used to strike/strum a stringed instrument.
Figure 3B:
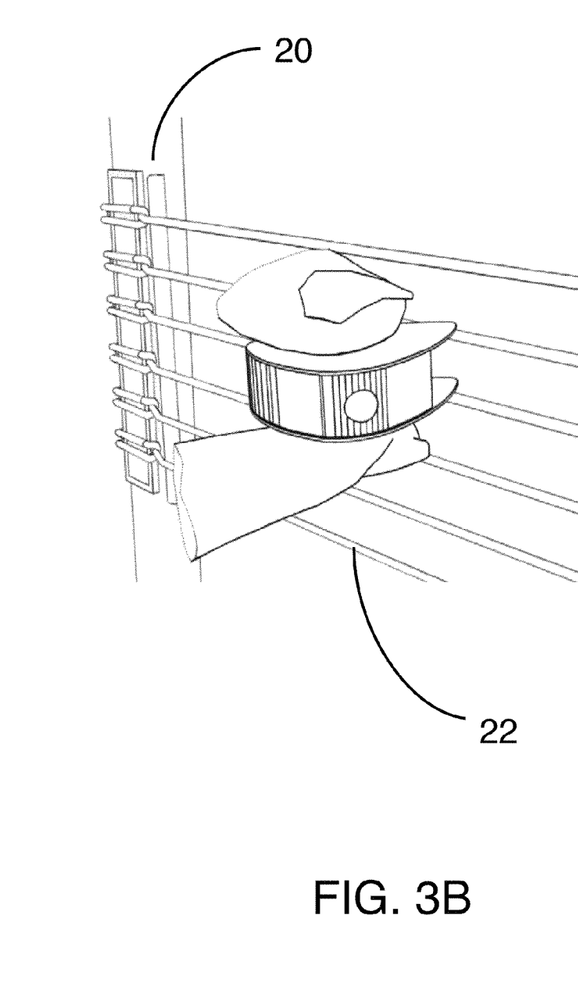

In one embodiment, the assembled dual plectrum system can be held or gripped between thumb 16 and forefinger 18. In one embodiment, an inherent adhesion quality of a material from which pivot spacer 14 is formed, such as softer-than-skin silicon, i.e., softer than human flesh, allows a musician to assemble or disassemble dual plectrum systems simply and quickly without the use of additional adhesives, mechanical fixtures, or modification to standard single plectrums. Alternatively, commercially available adhesives can be used to securely affix pivot spacer 14 to one or both of the upper and lower plectrums.

Preferably, upper plectrum 10a and lower plectrum 10b can be allowed to move independently as the musician strikes/strums the stringed instrument. The independent movement of the upper and lower plectrum is similar to the movement seen when a single plectrum is held or gripped by thumb 16 and forefinger 18.

Figure 4:
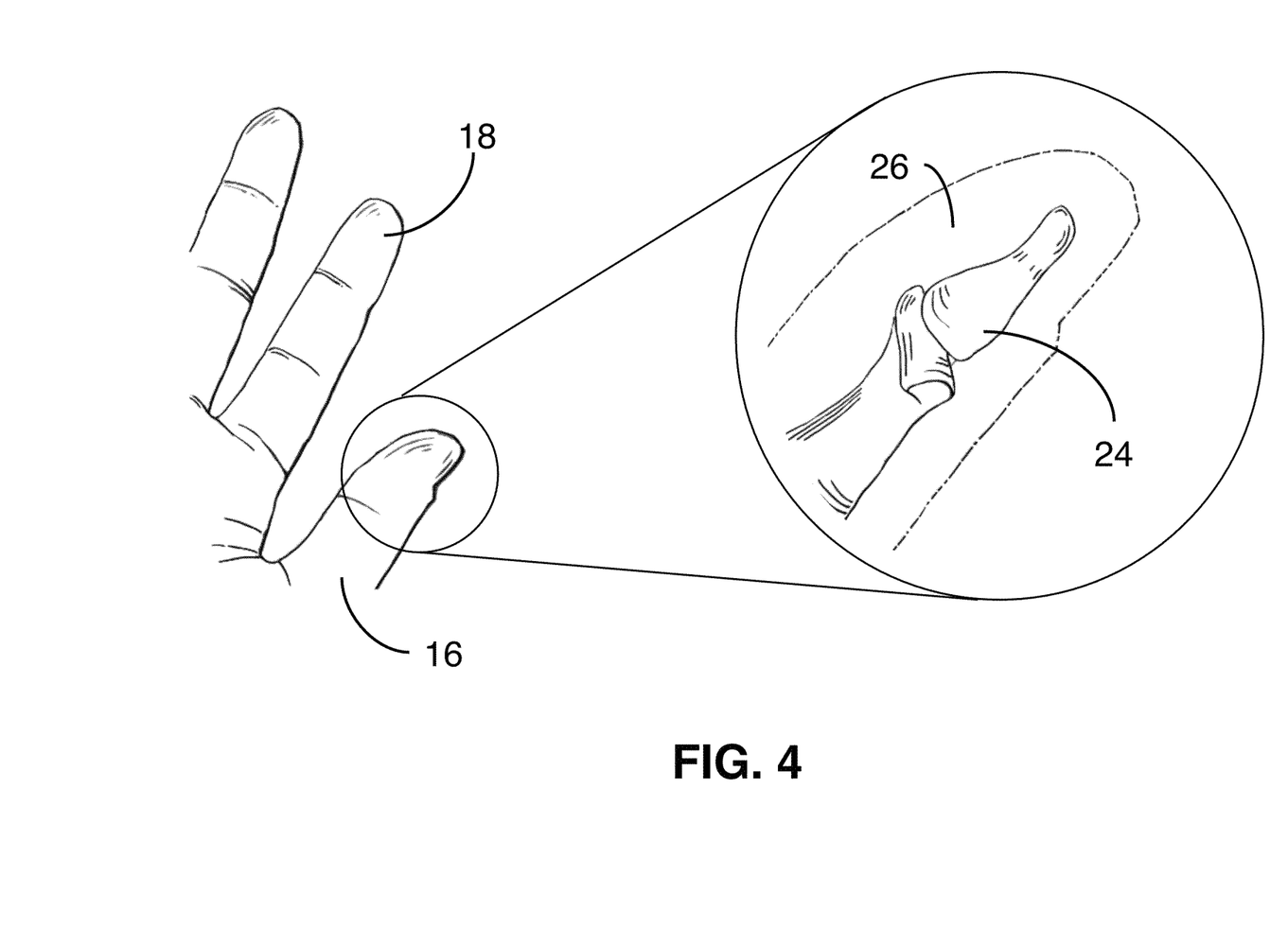
FIG. 4 illustrates some of the structural elements of a finger as it pertains to the holding of a plectrum.

To describe how this independent movement is accomplished, the movement of a single plectrum will now be described. FIG. 4 illustrates the underlying structure of the fingers of the human hand. The portions of thumb 16 and forefinger 18 used for gripping a plectrum can be described functionally as a composite structure comprising hardened bone core 24 that is encased in soft, flexible fleshy material 26.

Figure 5:
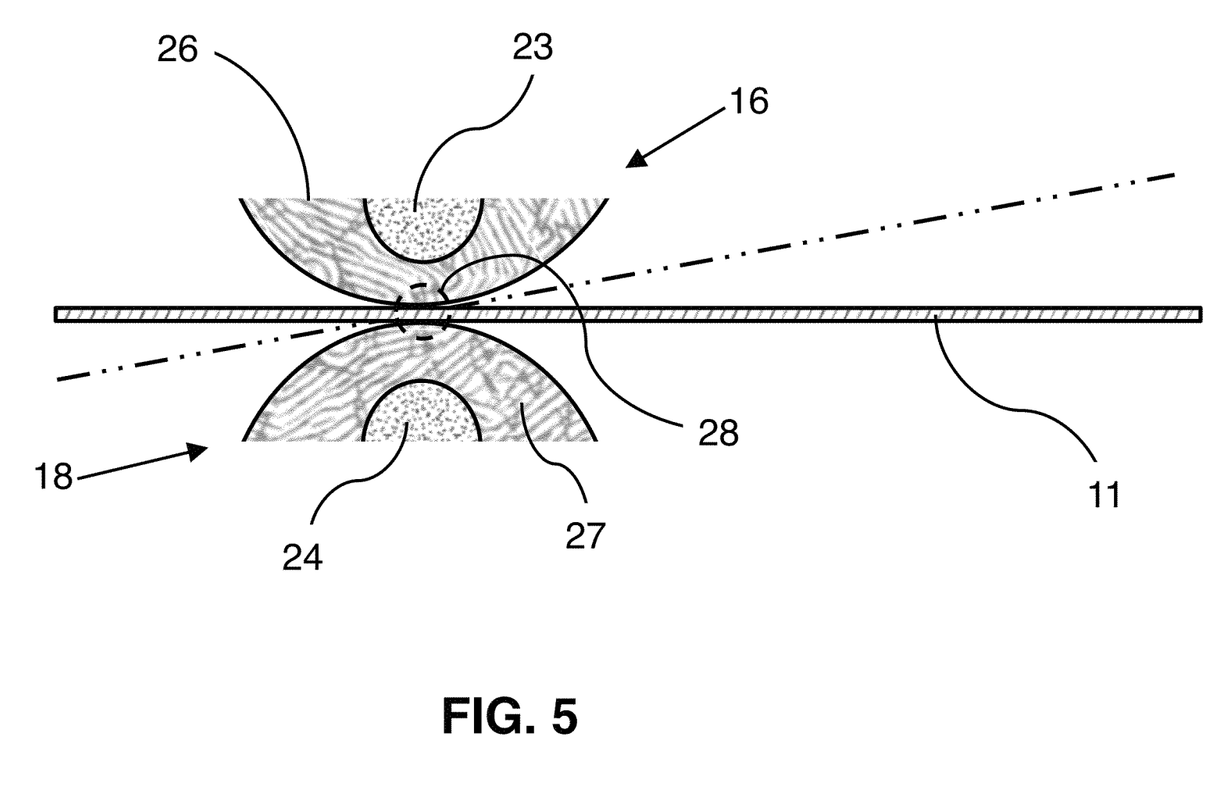
FIG. 5 is a diagram illustrating how a user can grip a single plectrum.

FIG. 5 illustrates a simplified schematic of a plectrum system created when a musician holds or grips a single plectrum between thumb 16 and forefinger 18. The gripping force of thumb 16 and forefinger 18 is concentrated in a single area of the plectrum and forms pivot point 28 that allows the plectrum to move as it comes in contact with the string. Soft part 26 of thumb 16 and soft part 27 of forefinger 18 allow the plectrum to rotate relatively freely about a neutral position while the force imposed by finger bones 23 and 24 form stable controllable pivot point 28. The amount of force applied to the plectrum by the user regulates the amount of rotation the plectrum can achieve.

Figure 6:
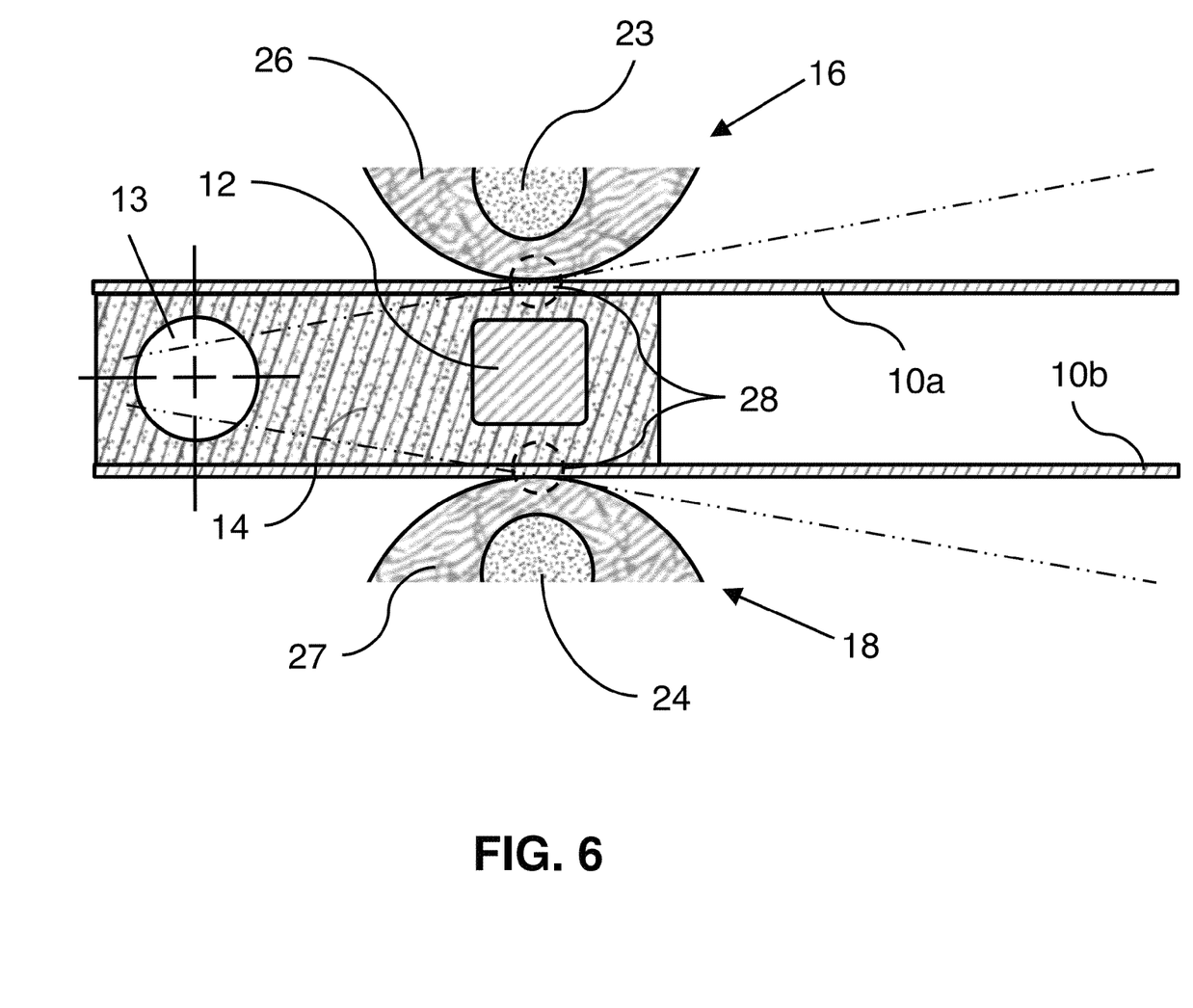
FIG. 6 is a diagram illustrating how a user can grip a dual plectrum as illustrated in FIG. 1.

FIG. 6 illustrates a simplified schematic of the dual plectrum system according to an embodiment of the present invention. By layering the composite structure comprising bone 23 and soft part 26 of thumb 16, upper plectrum 10a, soft pivot spacer 14, hard pivot core 12, soft pivot spacer 14, lower plectrum 10b, and the composite structure comprising bone 24 and soft part 27 of forefinger 18 in illustrated fashion, two pivot points 28 are created. One pivot point 28 for upper plectrum 10a and one for lower plectrum 10b. In addition, shifting the location of pivot points 28 closer to perforation 13, increases the strike-point distance between upper plectrum 10a and lower plectrum 10b as the thickness of spacer 14 is decreased at perforation 13.

Figure 7:
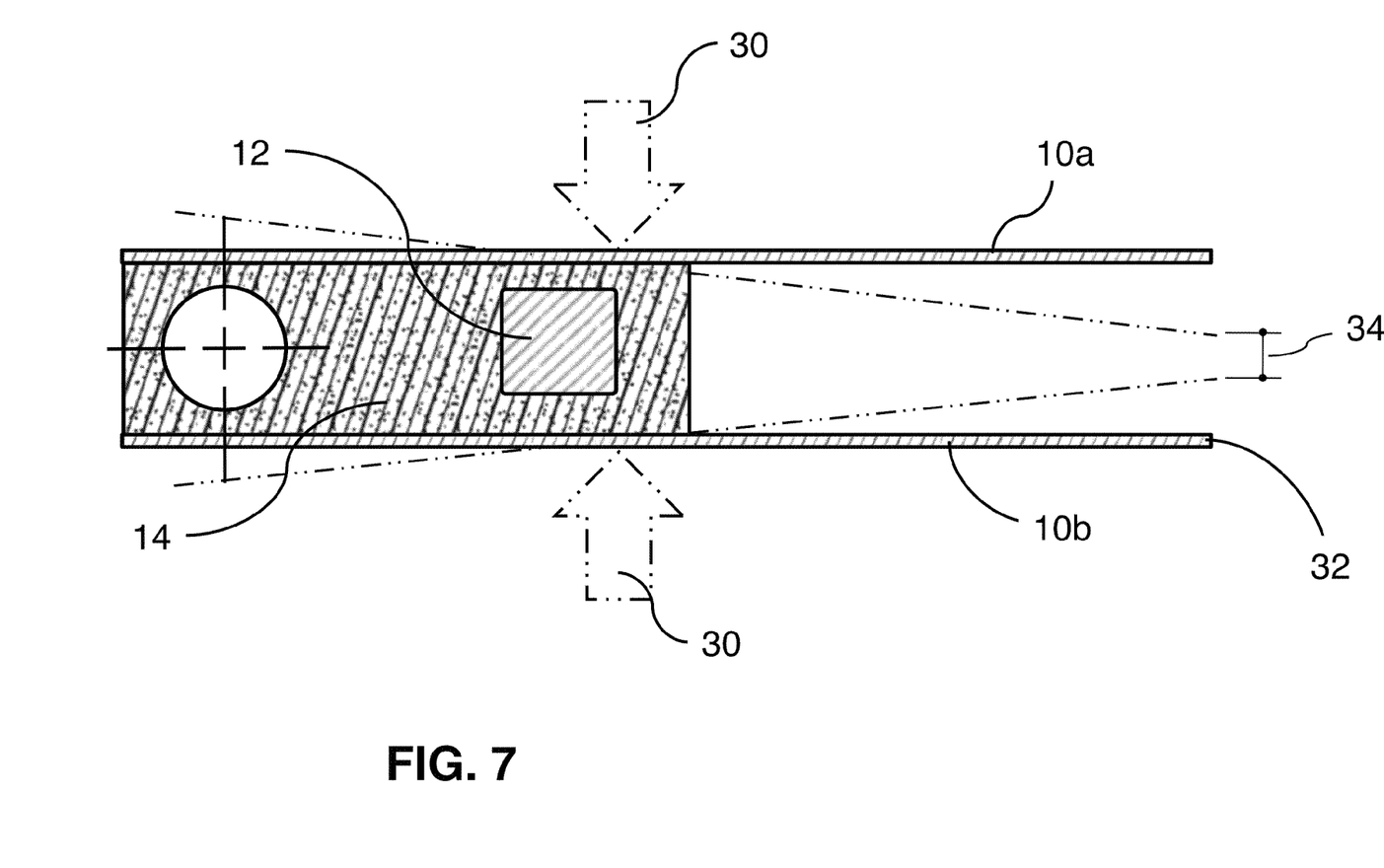
FIG. 7 is a diagram illustrating how the distance between the two strike points of an embodiment of a dual plectrum can be changed by slightly shifting the location of the gripping force exerted by the user.
Figure 8:
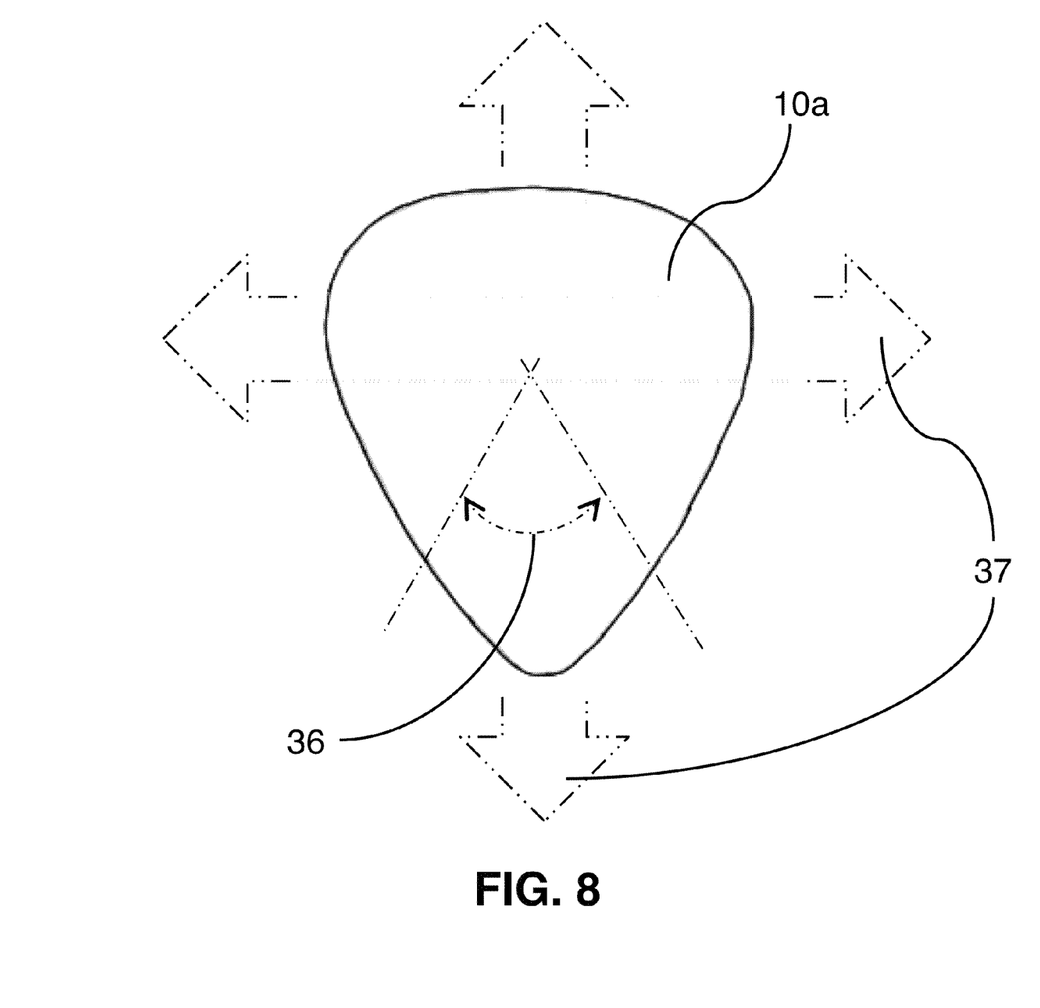
FIG. 8 shows how the dual plectrum system will allow the musician to rotate and/or translate one plectrum relative the other.

As illustrated in FIG. 7, another feature of this embodiment is the ability to change the dual plectrum system strike-point distance 34 (i.e., the distance between the tips of plectrum 10a and 10b) during use. By shifting the thumb and forefinger gripping force 30 forward of hard pivot core 12, the strike-point distance is reduced. Similarly, shifting the thumb and forefinger gripping force behind the hard pivot core will increase the strike-point distance. Soft pivot spacer 14 also allows the musician to translate upper plectrum 10a relative to lower plectrum 10b along the plane of the plectrum. As illustrated in FIG. 8, upper plectrum 10a can be rotated 36 or shifted 37 to change the character of the resulting sounds when the dual plectrum system strikes/strums the musical instrument's strings.

Figure 9:
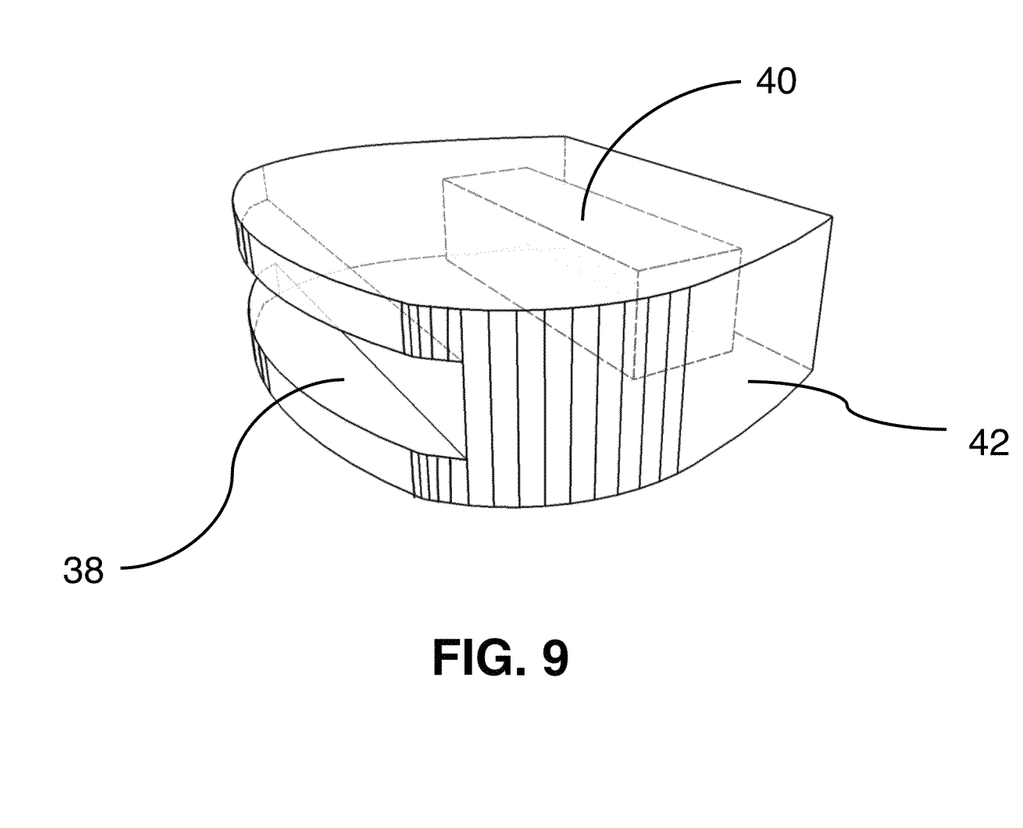
FIG. 9 illustrates a different embodiment of a spacer-pivot.

FIG. 9 illustrates a different embodiment of an improved dual plectrum system constructed in accordance with the teachings of the various embodiments of the present invention. In this embodiment, the plectrum coupler comprises hard pivot core 40 in the form of an elongated cuboid that can be made of, for example, a stiff silicon rubber or aluminum; and preferably soft pivot spacer 42 formed, for example, from a softer-than-skin silicon rubber; and further comprising spacer groove 38, to enhance the independent movement of upper and lower plectrums when used to assemble a dual plectrum system.

In one embodiment, the shape of core 40 need not comprise an elongated cuboid, rather, it can comprise virtually any shape, including but not limited to cylindrical, elongated triangular and other elongated and/or extruded shapes. In one embodiment, core 40 can be formed from any material that is at least somewhat rigid, including plastics, metals, composites, woods, rubbers, combinations thereof, and the like.

By allowing independent mobility for each plectrum, the sounds resulting from the dual plectrum closely resemble the sound of two separate and independent plectrums being played simultaneously. Embodiments of the present invention solve a problem encountered by other dual plectrum concepts in which the structure connecting the two plectrum elements is relatively stiff. Embodiments of the present invention thus avoid the greatly diminished sound quality that results by use of known dual plectrum systems.

An embodiment of the present invention comprises a method for manufacturing a composite spacer-pivot comprising: forming a hardened pivot core, inserting hardened pivot core into a mold, injecting softer pivot spacer material into the mold, and curing a resulting composite structure.

Another embodiment of the present invention comprises a method for assembling a dual plectrum system comprising: aligning and placing an assembled plectrum coupler device onto a lower independent plectrum (which can optionally be an off-the-shelf plectrum); aligning and placing an upper independent plectrum (which can also optionally be an off-the-shelf plectrum) onto coupler device, compressing dual plectrum system to cause adhesion forces between the soft pivot spacer and the upper and lower plectrum to bind the assembled composite structure to a sufficient level for use on a stringed instrument. By using off-the-shelf plectrums, embodiments of the present invention do not compete with current plectrum manufacturers. On the contrary, the manufacture of off-the-shelf plectrums is complemented. This improves the marketability of the embodiments of the present invention.

Yet another embodiment of the invention comprises a method for striking the strings of an instrument using an assembled dual plectrum device comprising: varying gripping pressure of an assembled dual plectrum device according to an embodiment of the present invention to control the level of independent movement of the individual plectrums, optionally rotating or translating one plectrum relative to the other to vary the texture and quality of the resulting sound, and varying the location of the gripping force to increase or decrease the double plectrum strike-point distance.

Industrial Applicability:

The invention is further illustrated by the following non-limiting examples.

A plectrum coupler device was manufactured by molding a pivot spacer. An aluminum pivot core was placed into a pivot spacer mold. A cylindrical rod was place across the back end of the mold to create a perforation across the spacer. Softer-than-skin silicon rubber was injected into the mold holding the aluminum pivot core and the resulting composite structure was allowed to cure. The cylindrical rod was removed and the spacer-pivot device that was obtained comprised a hardened pivot core and a perforation across the softer-than-skin silicon material at the back end of the device. A dual plectrum system was assembled using two standard off-the-shelf plectrums, by sandwiching the spacer between an upper and a lower plectrum. The resulting dual plectrum system was used to strum the strings of a six-stringed guitar. The resulting sound was of a quality approaching that of a twelve-stringed guitar being strummed by a single plectrum held in between a human thumb and index finger. Shifting the position of the points of pressure made by the fingers to different areas of the dual plectrum system changed the strike-point distance between the plectrums and resulted in different sound effects being produced.

The preceding examples can be repeated with similar success by substituting the generically or specifically described components and/or operating conditions of embodiments of the present invention for those used in the preceding examples.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A dual plectrum composite coupler comprising:
   a spacer material, said spacer material comprising an upper surface and a lower surface;
   a pivot core, said pivot core embedded at least partially in said spacer material;
   said pivot core comprising a hardness which is greater than a hardness of said spacer material; and
   said coupler comprising dimensions and a shape which accommodate a pair of plectrums that can be respectively disposed on said upper and said lower surfaces of said coupler and when so disposed thereon at least a tip of each of the plectrums does not contact said coupler.

2. The composite coupler of claim 1 wherein said spacer material has inherent adhesion quality to hold the pair of plectrums in place for strumming a stringed instrument when said composite coupler is sandwiched between two plectrums to form a dual plectrum system.

3. The composite coupler of claim 1 wherein said pivot core is made of a material having a hardness harder than Shore A 00-20.

4. The composite coupler of claim 3 wherein said pivot core material is selected from the group consisting of metals, stiff plastics, wood, bone, glass, stone, concrete, cured resins, PVC, PE, PS, nylon, rubber, stiff silicon rubber, and vinyl.

5. The composite coupler of claim 1 wherein said pivot core is placed approximately on the center of said coupler.

6. The composite coupler of claim 5 wherein said spacer material comprises softer-than-skin silicon rubber.

7. The composite coupler of claim 1 wherein said spacer material is moldable and squeezable.

8. The composite coupler of claim 1 wherein said spacer material comprises one or more perforations.

9. The composite coupler of claim 1 wherein said spacer material comprises one or more grooves.

10. A dual plectrum system comprising said dual plectrum composite coupler of claim 1 and said pair of plectrums.

11. The dual plectrum system of claim 10 wherein said pivot core is placed approximately at the center of the plectrums.

12. A method for manufacturing a composite coupler comprising:
    providing a coupler mold;
    providing a hardened pivot core;
    inserting the hardened pivot core into the mold;
    injecting moldable spacer material softer than the pivot core into the mold; and
    curing a resulting composite structure.

13. The method of claim 12 further comprising holding the hardened pivot core in place so that it is embedded near a center portion of the composite coupler after curing.

14. The method of claim 12 further comprising placing an elongated member across the mold in a strategic place to create a cavity in the spacer material when said elongated member is removed therefrom.

15. A method for assembling a dual plectrum system comprising said dual plectrum composite coupler of claim 1 comprising:
    aligning and placing an assembled composite coupler device onto a lower independent plectrum;
    aligning and placing an upper independent plectrum onto the composite coupler device; and
    compressing the dual plectrum system to cause adhesion forces between the soft spacer material of the composite coupler and the upper and lower plectrums to bind the assembled composite coupler to a sufficient level for use on a stringed instrument.

16. The method of claim 15 further comprising rotating the plectrums relative to each other.

17. The method of claim 15 further comprising shifting the plectrums relative to each other.

18. The method of claim 15 further comprising affixing one or more of the plectrums to the composite coupler.

19. A method for striking the strings of a stringed instrument using an assembled dual plectrum device comprising said dual plectrum composite coupler and plectrums of claim 1.

20. The method of claim 19 further comprising varying gripping pressure of an assembled dual plectrum device to control the level of independent movement of the individual plectrums.

21. The method of claim 19 wherein the plectrums are rotated relative to each other to vary the texture and quality of the resulting sound.

22. The method of claim 19 further comprising varying the gripping pressure by changing the location of the gripping force to increase or decrease the double plectrum strike-point distance.

* * * * *